United States Patent [19]

Nielsen et al.

[11] 4,409,524
[45] Oct. 11, 1983

[54] ARRANGEMENT FOR CONTROLLING THE DRIVING AND BRAKING CURRENT OF A BRUSHLESS D.C. MOTOR

[75] Inventors: Henrik B. Nielsen, Nordborg; Nils H. Nygaard, Rødding, both of Denmark

[73] Assignee: Danfoss A/S, Nordborg, Denmark

[21] Appl. No.: 208,529

[22] Filed: Nov. 20, 1980

[30] Foreign Application Priority Data

Dec. 6, 1979 [DE] Fed. Rep. of Germany ....... 2949017

[51] Int. Cl.³ .............................................. H02P 6/02
[52] U.S. Cl. .................................. 318/138; 318/254; 318/439
[58] Field of Search ........................ 361/23, 30, 31, 33; 318/138, 254, 439, 254 A, 521, 523, 526, 529, 350, 351, 356, 375, 376, 459, 783, 792

[56] References Cited

U.S. PATENT DOCUMENTS

| | | | |
|---|---|---|---|
| 3,909,693 | 9/1975 | Yoshitake et al. | 318/138 X |
| 3,911,338 | 10/1975 | Igarashi et al. | 318/138 |
| 4,065,706 | 12/1977 | Gosling et al. | 318/138 X |
| 4,167,691 | 9/1979 | Sorensen et al. | 318/738 |
| 4,270,076 | 5/1981 | Nygaard | 318/138 X |

Primary Examiner—Ulysses Weldon
Attorney, Agent, or Firm—Wayne B. Easton

[57] ABSTRACT

The invention relates to a control circuit for controlling the driving and braking current of a brushless type DC motor of the type having a permanent magnet rotor and a pair of poles provided with two windings, the windings having a common junction which is connectable to the positive terminal of a DC voltage source. The windings are double wound on the core of the motor stator and a pair of controllable switching elements are in respective series with the windings. A scanning commutating circuit responsive to the angular position of the rotor has dual outputs for switching the switching elements on and off in a push-pull mode. Free wheeling diodes are connected respectively to the junctions of the windings and the switching elements and first and second current measuring resistors are in respective series relation to the switching elements and the diodes. A comparator circuit responsive to varying voltage drops effected by the current measuring resistors alternately blocks and unblocks the output of the scanning commutating circuit when the currents in the current measuring resistors reach predetermined values.

5 Claims, 7 Drawing Figures

U.S. Patent
Oct. 11, 1983
4,409,524
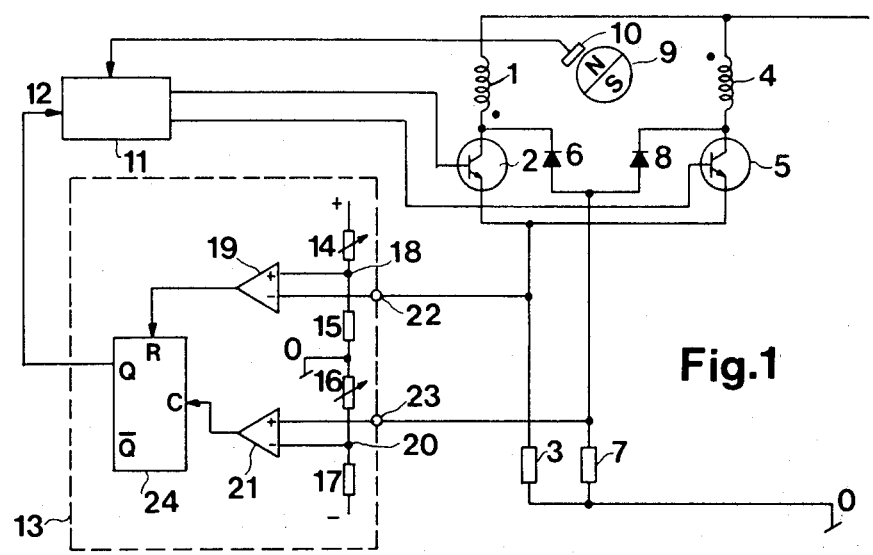
Fig.1
Fig.2
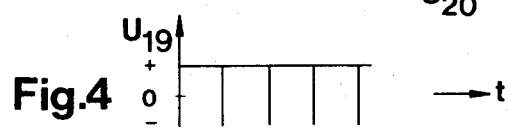
Fig.3
Fig.4
Fig.5
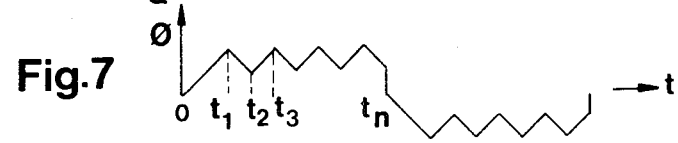
Fig.6
Fig.7

ARRANGEMENT FOR CONTROLLING THE DRIVING AND BRAKING CURRENT OF A BRUSHLESS D.C. MOTOR

The invention relates to an arrangement for controlling the driving and braking current of a brushless D.C. motor having a permanent magnet rotor and stator windings, comprising semi-conductor switching elements applied to an operating voltage source and each in series with a respective stator winding, free-running diodes associated with the respective stator windings, a control circuit for the semi-conductor switching elements, a sensor which scans the rotary position of the rotor and controls the semi-conductor switching elements by way of the control circuit in response to the rotary position of the rotor, comparator means which likewise act on the control circuit and have two inputs, and current measuring apparatus which is in series with the stator windings, measures the stator winding current and the free-running diode current and, by way of the comparator means, cyclically releases or blocks the delivery of control signals of the control circuit.

In a known arrangement of this kind, the current measuring apparatus comprises a current measuring resistor in series with each stator winding. The current measuring resistors are all connected to a common current supply line which also communicates with the free-running diodes by way of a common voltage limiting circuit. In this way, the free-running current can also be measured and limited. Limitation of the current prevents demagnetization of the permanent magnet rotor and protects the free-running diodes as well as the semi-conductor switching elements from overloads. Such an arrangement is comparatively expensive.

The invention is based on the problem of providing an arrangement of the aforementioned kind that is of simpler construction and also protects the semi-conductor switching elements are free-running diodes from overloads during braking of the motor (when operating as a generator).

According to the invention, this problem is solved in that the current measuring apparatus comprises a first current measuring device common only to the stator windings and a second current measuring device common only to the free-running diodes, that the first current measuring device is connected to the one input and the second current measuring device to the other input of the comparator means, and that the comparator means feed a releasing signal or a blocking signal to the control circuit in response to a comparison of the measuring signal of the first current measuring device with a first current limiting value and of the measuring signal of the second current measuring device with a second current limiting value.

In this way, a single current measuring device will be sufficient for all the phases of the motor and a single current measuring device will be sufficient for all the free-running diodes.

The comparator means preferably have a trigger behaviour and trigger over on exceeding an upper and a lower current limiting value. By appropriately choosing the limiting values, one can limit the load on the semi-conductor components and at the same time the mean value of the magnetic flux produced by the stator windings can be set to suit the desired rotary speed. In particular, the limiting values can be so closely juxtaposed that the trigger frequency is higher then the motor frequency and preferably higher than the audio frequency range.

The comparator means may comprise two comparators of which one comparator is allocated to comparing the measuring signal of the first current measuring device with the first current limiting value and the other comparator is allocated to comparing the measuring signal of the second current measuring device with the second current limiting value. Although it is basically possible to employ only one comparator, the use of two comparators permits the current limiting values to be set independently of each other.

The output signals of the two comparators can be fed to a respective one of two inputs of a flip-flop that oppositely influence the trigger condition of the flip-flop. In this way one can maintain a very rapid change of polarity for the input signal difference of the one comparator up to a change with the correct sign in the input signal difference of the other comparator, and vice versa.

Particularly in the case of a motor having only two stator windings offset by 180°, it is favourable for each free-running diode to bridge the semi-conductor switching element which switches on and off the stator winding associated with that diode, for each free-running diode to be in anti-parallel with the semi-conductor switching element between the side of the semi-conductor switching element connected to the stator coil and the pole of the D.C. operating voltage source connected to the other side of the semi-conductor switching element, and for the stator windings to be double-wound. With a simple construction, this ensures that the energy stored in the magnetic field of a stator winding that has just been switched off is dissipated as a free-running current by way of the other stator winding to limit the voltage at the semi-conductor switching element that has just been switched off but the energy will nevertheless continue to act in the same direction of rotation. This increases the efficiency.

Next, the side of the semi-conductor switching elements remote from the stator windings can together be connected by way of a first current measuring resistor and the side of the free-running diodes remote from the stator windings can together be connected by way of a second current measuring resistor to the associated pole of the D.C. operating voltage source. This permits a particularly simple construction for the comparator as a differential amplifier with one reversing input and one non-reversing input.

In this case the reversing input of the one comparator can be connected to the current measuring resistor having a positive voltage drop for the normal operating current direction and the non-reversing input of this comparator can be at a reference potential corresponding to the upper current limiting value; further, the non-reversing input of the other comparator can be connected to the current measuring resistor having a negative voltage drop when a free-running current flows and the reversing input of this comparator can be at a reference potential corresponding to the lower current limiting value. When an operating current flows through the one current measuring resistor, the voltage drop at the other and consequently also the voltage at the connected input of the one comparator is zero because in this case no current flows through the other current measuring resistor, the converse being the case when a free-running current is flowing.

The reference potentials at the respective comparator inputs are preferably adjustable. This permits simple variation of the current limiting values and thus also of the switching frequency (chopper frequency) of the semi-conductor components).

A preferred example of the invention will now be described in more detail with reference to the drawing, wherein:

FIG. 1 is a circuit diagram of the current control arrangement, and

FIGS. 2 to 7 show the time behaviour of a few electrical parameters in the control arrangement and in the connected motor for the purpose of explaining the function.

According to FIG. 1, a stator winding 1, a transistor 2 and a current measuring resistor 3 are in series at the poles (+) and (0) of a D.C. operating voltage source (not shown). The D.C. operating voltage source is also applied to a second stator winding 4, a transistor 5 and the current measuring resistor 3 connected in series. The stator windings 1 and 4 are double-wound on the core of the stator.

The junction of the transistor 2 and stator winding 1 is connected by way of a free-running diode 6 and a second current measuring resistor 7 to the zero potential pole (0) of the D.C. operating voltage source. Similarly, the junction of the transistor 5 and stator winding 4 is connected by way of a second free-running diode 8 and the second current measuring resistor 7 to the pole (0) of the D.C. operating voltage source. The free-running diodes 6 and 8 are poled oppositely to the transistors 2 and 5.

The D.C. motor has a diagrammatically indicated permanent magnet rotor 9 of which the rotary position is scanned by a sensor 10 which relies on the magnetic field. By way of a control circuit 11 which is connected on the output side to the bases of the transistors 2 and 5, the sensor 10 effects commutation of the transistors after each half rotation of the rotor.

The control circuit 11 has a blocking input 12 connected to the output Q of a comparator device 13. The comparator device 13 comprises a voltage divider of four ohmic resistors 14 to 17. The resistor 14 is connected on the one hand to the positive pole (+) and on the other hand by way of the resistor 15 to a pole (0) of a D.C. voltage source (not shown) which is likewise at zero potential, whereas the resistor 15 is connected on the one hand to this zero potential pole (0) and on the other hand by way of the resistor 17 to the negative pole (−) of said D.C. voltage source. The resistors 14 and 16 are adjustable.

The junction 18 of the resistors 14 and 15 is connected to the non-reversing input (+) of a comparator 19 and the junction 20 of the resistors 16 and 17 is connected to the reversing input (−) of a comparator 21. The reversing input (−) of the comparator 19 is also connected to the one input 22 of the comparator device 13 and to the junction of the transistor 2 and current measuring resistor 3, whilst the non-reversing input (+) of the comparator 21 is at the same time connected to the other input 23 of the comparator device 13 and to the junction of the transistor 5 and current measuring resistor 7. The comparators 19 and 21 are differential amplifiers with a very high amplification and a trigger behaviour. If the potential at the reversing input (−) exceeds that at the non-reversing input (+) in the positive direction, then the comparator output signal triggers over to a negative (low) value, and vice versa.

The output of the comparator 19 is connected to an input R and the output of the comparator 21 to an input C of a flip-flop 24. These inputs oppositely influence the condition of the output signal of the flip-flop 24 at an output Q which at the same time forms the output of the comparator device 13. When the signal at the input R drops, i.e. when the rear flank of the output signal of the comparator 19 occurs, the flip-flop 24 is so triggered that a blocking signal $\overline{U}_Q$ (logically zero) arises at the output Q. If, however, the signal at the input C rises after a drop of the signal at the input R, i.e. the front flank of the output signal occurs at the comparator 21, the flip-flop 24 is so triggered that a releasing signal $U_Q$ (logically one) occurs at the output Q.

This results in the following operation for the arrangement of FIG. 1 with reference to FIGS. 2 to 7.

At the time t=0, it is assumed that the control signal given by the sensor 10 is positive and the releasing signal $U_Q$ (FIG. 6) is present at the output Q or at the input 12. The control signal is therefore allowed to pass by the control circuit 11 and, since we are here considering the first half of the rotor rotation, fed to the base of the transistor 2 whereas the transistor 5 receives no control signal. The transistor 2 thereupon becomes conductive so that a substantially linearly rising current flows from the positive pole (+) of the D.C. operating voltage source through the stator winding 1, the transistor 2 and the current measuring resistor 3 to the pole (0) of the D.C. operating voltage source that is at zero potential. The magnetic flux $\phi$ (FIG. 7) produced by this current flowing through the stator winding 1 therefore rises substantially linearly until this current causes a voltage drop $U_3$ (FIG. 2) at the current measuring resistor 3. At the instant $t_1$, this voltage drop exceeds the voltage $U_{18}$ (FIG. 2) which is set by means of the resistor 14 at the junction 18 and corresponds to an upper current limiting value. This triggers the comparator 19 so that its hitherto positive output signal $U_{19}$ becomes negative (FIG. 4), the flip-flop 24 likewise triggers, the blocking signal $\overline{U}_Q$ (FIG. 6) occurs at the output Q, and the control signal fed to the base of the transistor 2 is blocked. The transistor 2 is therefore blocked at the instant $t_1$ so that the current in the stator winding 1 is interrupted and the voltage drop $U_3$ caused by this current disappears at the current measuring resistor 3 and at the same time the comparator 19 or its output signal $U_{19}$ triggers back (FIG. 4) without thereby influencing the condition of the flip-flop 24. However, since both stator windings 1 and 4 are magnetically coupled by the core of the stator, the magnetic energy stored in the magnetic field up to the instant $t_1$ can be dissipated by way of the stator winding 4. This is because as long as a current was flowing in the stator winding 1, a voltage was induced in the stator winding 4 that was poled so that it tended to impel a current in the pass direction of the block transistor 5 and against the pass direction of the free-running diode 8. However, interruption of the flow of current in the stator winding 1 induces a voltage in the stator winding 4 that is higher than the D.C. operating voltage source and is poled opposite thereto. The voltage induced in the stator winding 4 by the interruption of current in the stator winding 1 can therefore now drive a current back into the D.C. operating voltage source that flows by way of the current measuring resistor 7 and the free-running diode 8. This current is negative in relation to the polarity of the current that was flowing by way of the current measuring resistor 3 and suddenly rises (in the negative direction) to a value which corresponds to the flux $\phi$ at the instant $t_1$. The (negative) voltage drop $U_7$ caused by this current at the current measuring resistor 7 immediately falls below the reference potential $U_{20}$ (FIG. 3) at the junction 20 that corresponds to the lower current limiting value, so that the comparator 21 now triggers and its output signal $U_{21}$ (FIG. 5) drops to a negative (or low) value. The negative current in the current measuring resistor 7 thereupon decreases substantially linearly corresponding to the dissipation of the magnetic energy stored in the magnetic field, so that the voltage drop $U_7$ likewise gradually falls (FIG. 3), i.e. the potential at the input 23 rises in the positive direction. At the instant $t_2$, this potential again exceeds the reference potential $U_{20}$ at the junction 20 so that the amplifier 21 triggers back again and the flip-flop 24 is set again by the rise in its output signal $U_{21}$. This again causes the releasing signal $U_Q$ to occur at the input 12 of the control circuit 11. The control signal of the sensor 10 is therefore again fed to the base of the transistor 2 and the transistor 2 again becomes fully conductive. Since a residual magnetic energy is still stored in the magnetic field at the instant $t_2$, the current in the current measuring resistor 3 rises and thus the voltage drop $U_3$ thereacross rises suddenly to a value corresponding to this residual energy, whereafter it continues to rise substantially linearly until at the instant $t_3$ the reference potential $U_{18}$ corresponding to the upper current limiting value has again been reached. Thereafter, the function as described is repeated until half a rotation of the rotor has been completed at the instant $t_n$. The control signal of the sensor 10 is now switched over to the base of the transistor 5 which was until now continuously blocked and this transistor is likewise released and blocked in the sequence of the change in the output signal of the comparator device 13 so that during the second half of one revolution of the rotor a substantially saw-tooth flow of flux is created in the same way as during the first half rotation but with the opposite polarity, as is shown in the right-hand lower half of FIG. 7. This negative flux now continues to act during the second half of one rotor revolution in the same direction as the positive flux acted during the first half of the rotor rotation.

The choice of the limiting values at which the comparators trigger over determines the mean value of the flux $\phi$ and thus the motor speed as well as the cycle or switching frequency of the transistors which is preferably beyond the audio frequency range.

Return of the energy stored in the magnetic field by way of one stator winding into the operating voltage source after the other stator winding has been switched off has the advantage that this energy partially also contributes to the torque of the motor. In addition, the transistors as well as the free-running diodes are protected from overloading. Limiting of the current is also effective when the motor is operating as a generator, e.g. during braking which in this case simultaneously constitutes regenerative braking. Braking can be readily achieved in that the one transistor is forcibly maintained to be continuously conductive.

Modifications of the illustrated example fall within the scope of the invention. Thus, the transistors may be replaced by other semi-conductor switching elements, e.g. switching off thyristors which, by means of control pulses of suitable polarity between the control connection and the associated main connection can be switched over not only from the blocking condition to the pass condition but also conversely from the pass condition to the blocking condition.

What is claimed is:

1. A control circuit for a brushless DC motor having a permanent magnet rotor and first and second stator windings, comprising, first and second semiconductor switching elements in respective series with said windings, said windings being double wound on the core of said stator, the core of said stator, first and second free wheeling diodes connected respectively to the junctions of said windings and said switching elements in oppositely poled relation to said switching elements, scanning circuit commutating means for alternately switching said elements on and off in accordance with the rotary position of said rotor, first and second current measuring means in respective series relation to said switching elements and said diodes, and comparator means responsive to said current measuring means for alternately blocking and unblocking the output of said scanning circuit commutating means when said first and second current measuring means reach predetermined values.

2. A control circuit according to claim 1 wherein said comparator means includes bistable output means for controlling said scanning circuit commutating means having two inputs connected respectively to said first and second current measuring means.

3. A control circuit according to claim 2 wherein said bistable output means has a trigger frequency substantially higher than the motor speed.

4. A control circuit according to claim 2 wherein said comparator means includes first and second comparator devices between said inputs thereof and said first and second measuring means.

5. A control circuit according to claim 4 wherein said first comparator device has its reversing input connected to said first current measuring means having a positive voltage drop for the normal oeprating current direction and its nonreversing input is at a reference potential corresponding to the upper current limiting value, said second comparator device having its nonreversing input connected to said second current measuring means having a negative voltage drop when a free running current flows and its reversing input is at a reference potential corresponding to the lower current limiting value.

* * * * *